(12) United States Patent
Ambat et al.

(10) Patent No.: US 8,504,531 B2
(45) Date of Patent: Aug. 6, 2013

(54) SYSTEM AND METHOD FOR APPLICATION AWARE DE-DUPLICATION OF DATA BLOCKS ON A VIRTUALIZED STORAGE ARRAY

(75) Inventors: Gopakumar Ambat, Bangalore (IN); Giribabu Balaraman, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 159 days.

(21) Appl. No.: 12/954,848

(22) Filed: Nov. 27, 2010

(65) Prior Publication Data
US 2012/0136841 A1 May 31, 2012

(51) Int. Cl.
*G06F 7/00* (2006.01)
*G06F 17/00* (2006.01)
*G06F 13/14* (2006.01)

(52) U.S. Cl.
USPC .......................................... 707/692

(58) Field of Classification Search
USPC ................. 707/609–610, 637, 645, 679, 654, 707/692–693, 821; 711/154–162; 709/226
See application file for complete search history.

(56) References Cited

U.S. PATENT DOCUMENTS

| | | | |
|---|---|---|---|
| 6,516,337 B1 * | 2/2003 | Tripp et al. | 709/202 |
| 2009/0063795 A1 * | 3/2009 | Yueh | 711/162 |
| 2010/0262790 A1 * | 10/2010 | Perego et al. | 711/154 |
| 2011/0138154 A1 * | 6/2011 | Tevis et al. | 712/220 |

* cited by examiner

*Primary Examiner* — Usmaan Saeed
*Assistant Examiner* — Cecile Vo
(74) *Attorney, Agent, or Firm* — Haynes and Boone, LLP

(57) ABSTRACT

A system and method for application aware de-duplication (de-dup) of data blocks in a virtualized storage array is disclosed. In one embodiment, in a method of application aware de-dup of data blocks on virtualized storage arrays in a storage area network, a de-dup agent is enabled on each of one or more components of the storage area network. A master list of metadata associated with indexed data is then created and stored in the virtualized storage arrays. One or more sublists of metadata are then created from the masterlist and are stored. Upon receiving a write request from an application residing in the host device, it is determined whether data block being written has an entry in a sublist stored in a host device, and if so, the data block is then replaced with a pointer indicating where the data block is residing in the virtualized storage arrays.

11 Claims, 5 Drawing Sheets

SYSTEM AND METHOD FOR APPLICATION AWARE DE-DUPLICATION OF DATA BLOCKS ON A VIRTUALIZED STORAGE ARRAY

FIELD OF TECHNOLOGY

Embodiments of the present subject matter relate to the field of storage systems. More particularly, embodiments of the present subject matter relate to de-duplication (de-dup) of data blocks on a virtualized storage array.

BACKGROUND

Data de-dup refers to comparing data blocks and removing duplicate data blocks to free up space in storage systems. Typically, de-dup is performed either at a file level or at a block level. Most of the storage vendors provide a host-based and/or an appliance based de-dup solutions. These solutions require additional hardware or appliance like data domain, or very specialized software like a specialized file system with additional de-dup aware business logic to perform the de-dup. Addition of these hardware components or appliance into a storage area network fabric for performing the de-dup requires a very high processing power for identifying duplicate data blocks in a data stream and may also need a physical location for storing a unique copy of each duplicate data block. Further, the new hardware or software component in the storage system may need to be configured and can require maintenance and support. This may result in an increased expense and complexity in the storage system.

SUMMARY

A system and method for application aware de-duplication (de-dup) of data blocks in a virtualized storage array is disclosed. According to one aspect of the present subject matter, in a method for application aware de-dup of data blocks on virtualized storage arrays in a storage area network (SAN), a de-dup agent is enabled on each of one or more components of the SAN. The one or more components of the storage array include a host device, a data path module (DPM), and virtualized storage arrays. Then, a master list of metadata associated with indexed data is created and stored in the virtualized storage arrays. One or more sublists of metadata are created from the masterlist and are stored in remaining one or more components of the SAN.

Upon receiving a write request from an application residing in the host device, it is determined whether a data block being written has an entry in the sublist stored in the host device. If so, the data block is replaced with a pointer indicating where the data block is residing in the virtualized storage arrays. If not, it is determined whether the data block being written has an entry in the sublist stored in the DPM. If it is determined that the data block being written has an entry in the sublist stored in the DPM, the data block is replaced with a pointer indicating where the data block is residing in the virtualized storage arrays.

If it is determined that the data block being written has no entry in the sublist stored in the DPM, it is determined whether the data block being written is in the masterlist stored in the virtualized storage arrays. If it is determined that the data block being written is in the masterlist stored in the virtualized storage arrays, the data block is replaced with a pointer indicating where the data block is residing in the virtualized storage arrays, and if it is determined that the data block being written is not in the masterlist stored in the virtualized storage arrays, the data block is written in one of the virtualized storage arrays. Further, the masterlist in the virtualized storage arrays is updated to include metadata associated with the written data block.

According to another aspect of the present subject matter, a SAN includes a host device, a DPM connected to the host device, and one or more virtualized storage arrays connected to the DPM. Each of the host device, the DPM and the one or more virtualized storage arrays includes an associated de-dup agent to enable application aware de-dup of data blocks on the one or more virtualized storage arrays in the storage area network, as described above.

According to yet another aspect of the present subject matter, a SAN includes a host device, and one or more virtualized storage arrays connected to the host device. Each of the host device and the one or more virtualized storage arrays includes an associated de-dup agent to enable application aware de-dup of data blocks on the one or more virtualized storage arrays in the storage area network, as described above.

According to a further another aspect of the present subject matter, a non-transitory computer-readable storage medium for application aware de-dup of data blocks on virtualized storage arrays in a SAN has instructions that, when executed by a computing device causes the computing device to perform the method as described above.

The methods, and systems disclosed herein may be implemented in any means for achieving various aspects, and other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for application aware de-duplication (de-dup) of data blocks in a virtualized storage array is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
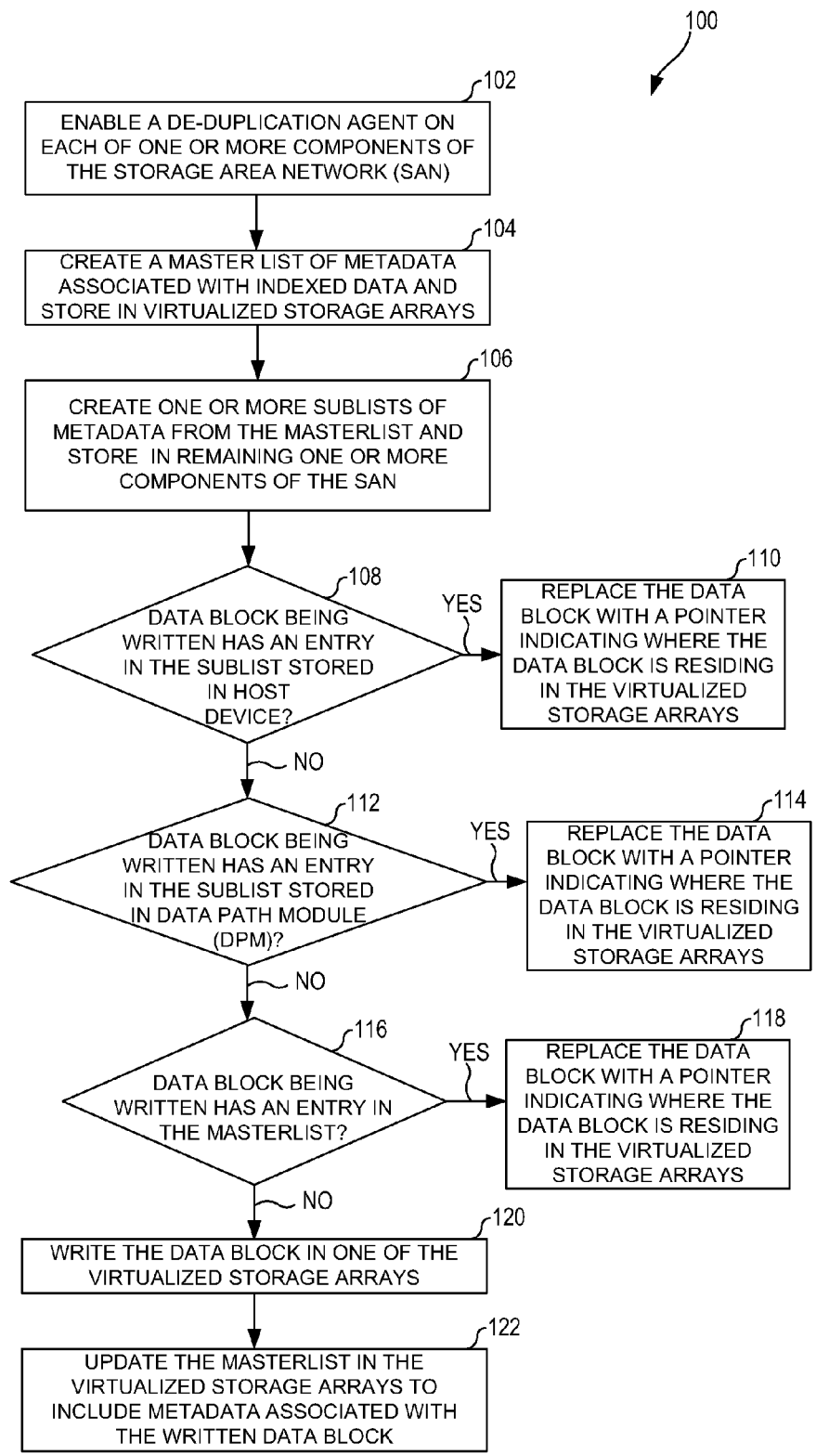
FIG. 1 illustrates a method for application aware de-duplication (de-dup) of data blocks on virtualized storage arrays in a storage area network (SAN), according to one embodiment.

FIG. 1 illustrates a method 100 for application aware de-dup of data blocks on virtualized storage arrays in a storage area network (SAN) (e.g., the SAN 214 of FIG. 2), according to one embodiment. At step 102, a de-dup agent is enabled on each of one or more components of the SAN. For example, the one or more components of the SAN include a host device (e.g., the host device 202 of FIG. 2), a data path module (DPM) (e.g., the DPM 216 of FIG. 2), and virtualized storage arrays (e.g., the virtualized storage arrays 222A-N of FIG. 2). The DPM is a software piece residing either on standardized hardware or running on a storage controller of the virtualized storage array.

At step 104, a master list of metadata associated with indexed data is created and stored in the virtualized storage arrays. For example, the master list of metadata is an ordered weightage list decided based on number of occurrences of data blocks in each of the virtualized storage arrays. At step 106, one or more sublists of metadata are created from the masterlist and are stored in remaining one or more components of the SAN. The creation of the masterlist and the sublists are explained in greater detail with respect to FIG. 2.

At step 108, it is determined whether a data block being written has an entry in the sublist stored in the host device upon receiving a write request from an application residing in the host device. If it is determined so, at step 110, the data block is replaced with a pointer indicating where the data block is residing in the virtualized storage arrays. If it is determined not, at step 112, it is determined whether the data block being written has an entry in the sublist stored in the DPM.

If it is determined that the data block being written has an entry in the sublist stored in the DPM, then at step 114, the data block is replaced with a pointer indicating where the data block is residing in the virtualized storage arrays. If it is determined that the data block being written has no entry in the sublist stored in the DPM, at step 116, it is determined whether the data block being written is in the masterlist stored in the virtualized storage arrays. If it is determined that the data block being written is in the masterlist stored in the virtualized storage arrays, then at step 118, the data block is replaced with a pointer indicating where the data block is residing in the virtualized storage arrays. If it is determined that the data block being written is not in the masterlist stored in the virtualized storage arrays, then at step 120, the data block is written in one of the virtualized storage arrays.

At step 122, the masterlist in the virtualized storage arrays is updated to include metadata associated with the written data block. Moreover, in one example embodiment, a non-transitory computer-readable storage medium for application aware de-dup of data blocks on virtualized storage arrays in the SAN, having instructions that, when executed by a computing device causes the computing device to perform the method as described above.

Figure 2:
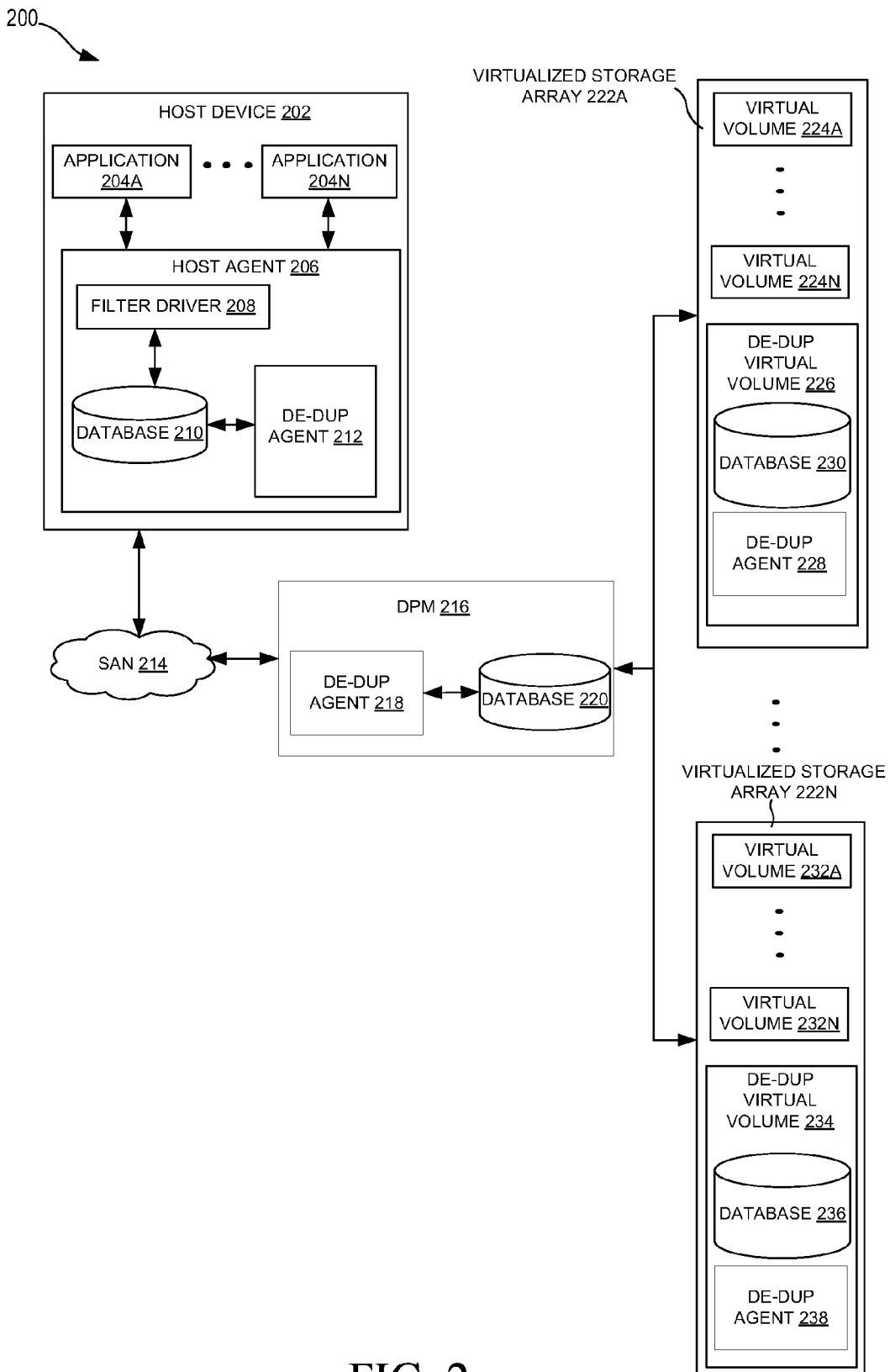
FIG. 2 illustrates a SAN environment employing the application aware de-dup of the data blocks on the virtualized storage arrays, according to one embodiment.

FIG. 2 illustrates a SAN environment 200 employing the application aware de-dup of data blocks on virtualized storage arrays 222A-N, according to one embodiment. As shown, FIG. 2 includes a host device 202 including applications 204A-N and a host agent 206. The host agent 206 includes a filter driver 208, a database 210, and a de-dup agent 212. The host device 202 is connected to the virtualized storage arrays 222A-N over a SAN 214. As shown, the virtualized storage arrays 222A-N are partitioned into thin provisioned virtual volumes 224A-N. Also, shown in FIG. 2 is a DPM 216 residing between the host device 202 and the virtualized storage arrays 222A-N. The DPM also includes a de-dup agent 218 and a database 220.

In one example, when a de-dup operation is initiated on a virtual volume 224A, a de-dup virtual volume 226 is created on the virtualized storage array 222A. The de-dup virtual volume 226 is a hidden volume and is not presented to the host device 202. Then, data blocks on the virtualized storage array 222A are read and a checksum per data block is created. The checksum is indexed to its location on the virtualized storage arrays 222A and is stored in a database 230 in the virtualized storage array 222A.

Figure 4:
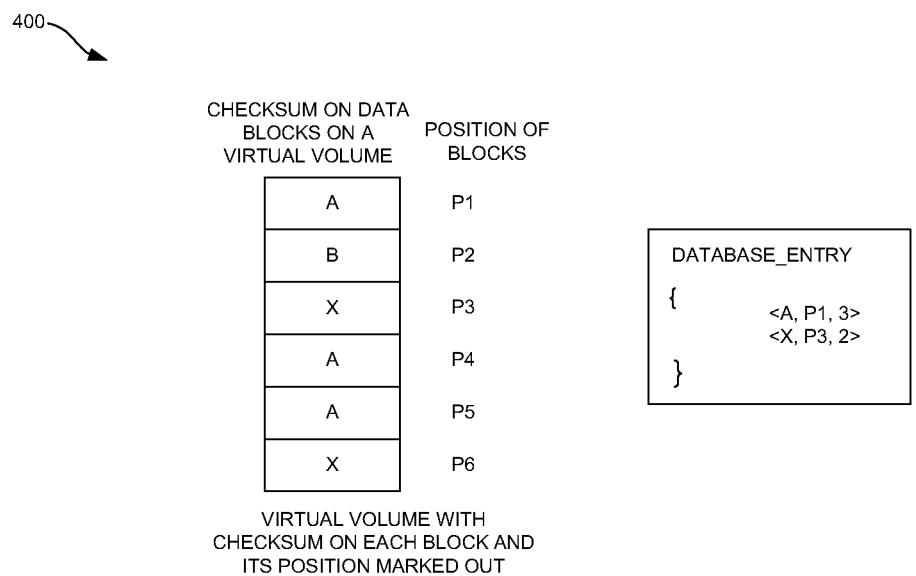
FIG. 4 illustrates a representation of a database for checksum computed across the data blocks on the virtualized storage arrays, according to one embodiment.

Further, number of times the checksum is found in the virtualized storage array 222A is stored in the database 230. Then, the database 230 is sorted to obtain a masterlist of metadata. For example, the master list of metadata includes an ordered weightage list whose order is decided based on number of occurrences of the data blocks in the virtualized storage array 222A. A representation of the database 230 for checksum computed across the data blocks on the virtualized storage array 222A is shown in FIG. 4.

According to an embodiment of the present subject matter, the masterlist of metadata in the database 230 is distributed across the SAN environment 200. For example, the host device 202 and the DPM 216 may request and obtain sublists from the masterlist of metadata. The sublist in the host device 202 reflects most duplicated data blocks and is stored in the database 210. The sublist in the DPM 216 may include more and different entries made available to the host device 202 and are stored in the database 220.

It can be seen that, only duplicate data blocks coming from the host device 202 after the masterlist and the sublists are formed in the respective databases are de-duped. This ensures that the masterlists and the sublists are formed offline and not by blocking input/output (I/O) from the host device 202. The filter driver 208 filters the data blocks coming from the host device 202 towards the virtualized storage arrays 222A-N. The method of application aware de-dup of the data blocks on virtualized storage arrays in the SAN is similar to the method described in FIG. 1.

Figure 3:
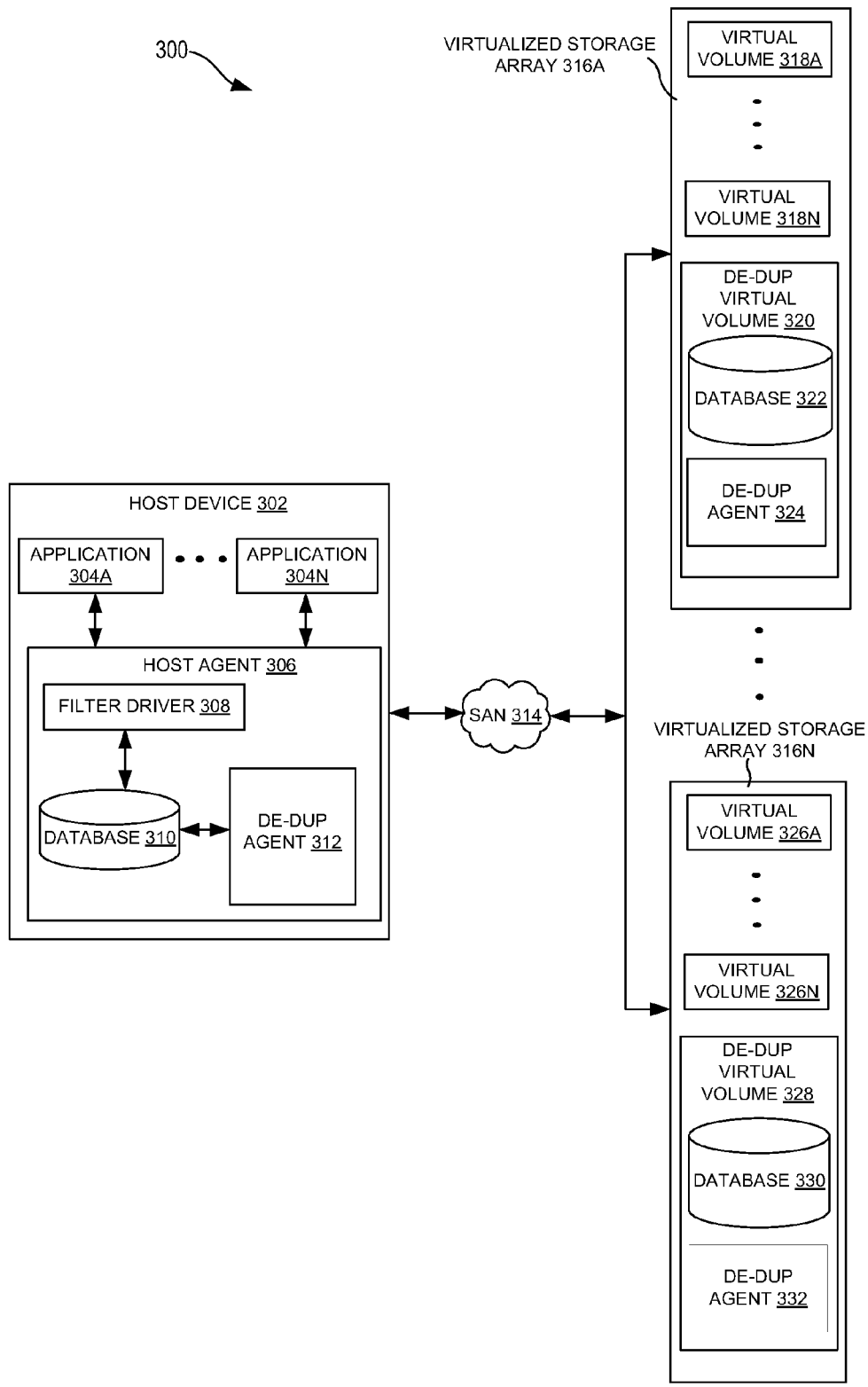
FIG. 3 illustrates yet another SAN environment employing the application aware de-dup of the data blocks on the virtualized storage arrays, according to one embodiment.

FIG. 3 illustrates yet another SAN environment 300 employing the application aware de-dup of data blocks on virtualized storage arrays 316A-N, according to one embodiment. The SAN environment 300 is similar to the SAN environment 200 except that the SAN environment 300 does not include a DPM.

FIG. 4 illustrates a representation 400 of the database 230 for checksum computed across the data blocks on the virtualized storage arrays 222A-N, according to one embodiment. As shown, as the virtual volumes 224A-N are parsed on a data block basis, every duplicate checksum identified is stored. The number of times the checksum is found is also stored. It can be seen that, smaller size of the data blocks, larger the size of database and vice versa. The checksum is indexed to original position on the virtualized storage arrays 222A-N. Then, the database 230 is sorted to obtain a ranked list (e.g., the masterlist) of most duplicate data blocks on the virtualized storage arrays 222A-N.

Figure 5:
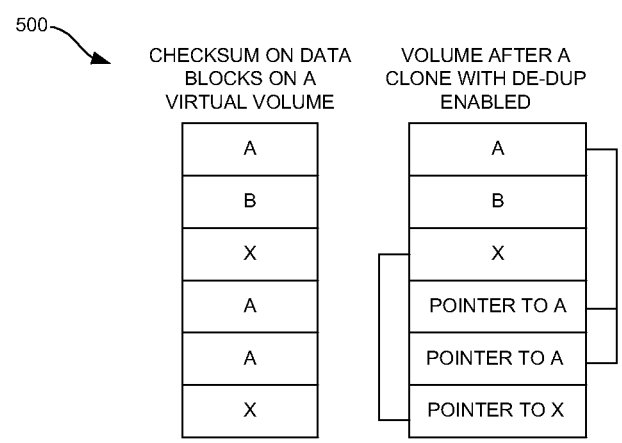
FIG. 5 illustrates a de-dup on an offline volume, according to one embodiment.

FIG. 5 illustrates a de-deup on an offline volume, according to one embodiment. Particularly, FIG. 5 depicts how a volume is re-sized after a clone or copy operation. According to one embodiment of the present subject matter, an offline de-dup capability may be incorporated in the SAN 214 depending on I/O performance. Here, the host agent 206 does not have any sublist from the masterlist and all I/Os are passed on directly to the DPM 216 which writes them to the appropriate volume on the virtualized storage arrays. At a pre-designated time or based on user action, the DPM 216 generates a checksum for each data block written new and compares that with the ones in the database 220 of the DPM 216. If any duplicate data blocks are found, the newly written copy is eliminated. The DPM 216 then inserts necessary metadata to ensure that a subsequent read operation can regenerate the de-duped data, as in the case of an online de-dup.

Such an offline approach may be integrated to a snapshot or a snapcopy or clone operation. When a snapshot is initiated, all further write operations on the point-in-time (PiT) can be checked for duplicates on the original volume (which is now a read-only volume), and duplicates, if any, eliminated. In such a way, the size of the entire PiT may be significantly reduced. Also, additionally, when a PiT is merged back to the original volume, the de-dup database can be now utilized to weed out all duplicates.

This also has special significance to a hierarchical storage management (HSM) system with the ability to eliminate duplicates while generating a copy or a clone. Thus, disk size needed for storing data in low cost/low I/O disk based solutions is greatly reduced. Once the copy is generated, the copied volume have internal references for all duplicate data blocks and may not have any references to the original volume from where the copy was initiated from. Any read operation also goes through the DPM 216. The DPM 216 looks in the database 220 to see if the data block being referenced has been de-duped and, if so, translates the read request to refer to an original copy on an appropriate virtual volume.

In various embodiments, the systems and methods described in FIGS. 1 through 5 reduces SAN traffic through an application aware and distributed de-dup on virtualized storage arrays. Since, the above-mentioned systems and methods do not require any specialized hardware or software, total cost of ownership is reduced. The above-described methods and systems also work well when primary data needs to be backed up (e.g., a snapclone or a copy) to a secondary volume for backup or test.

Further, the above-described methods and systems fits well into a hierarchical storage management (HSM) policy that customers might have when they plan for data retention with lower cost media. The above-described methods and systems fit into both inline de-dup solution as well as offline de-dup solution. The above-described methods and systems also enable generating a PiT copy and merging back the PiT to an original volume. Further, the above-described methods and systems enable a user to specify exact virtual volume where the de-dup has to be enabled based on requirements.

Although the present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for application aware de-duplication (de-dup) of data blocks on one or more virtualized storage arrays in a networked storage system, comprising:
   enabling a de-dup agent on each of a host device, a data path module (DPM), and one or more virtualized storage arrays, wherein the DPM is connected between the host device and the one or more virtualized storage arrays such that operations between the host device and the one or more virtualized storage arrays are communicated via the DPM;
   creating a master list of metadata associated with indexed data and storing the masterlist in the one or more virtualized storage arrays;
   creating one or more sublists of metadata from the masterlist and storing the one or more sublists in one or more of the host device and the DPM;
   upon receiving a write request from an application residing in the host device, determining whether a data block being written has an entry in the sublist stored in the host device;
   if the data block has an entry in a sublist stored in the host device, replacing the data block with a pointer indicating where the data block is residing in the one or more virtualized storage arrays;
   if it is determined that the data block being written has no entry in the sublist stored in the host device, determining whether the data block being written is in the masterlist stored in the one or more virtualized storage arrays;
   if it is determined that the data block being written is in the masterlist stored in the one or more virtualized storage arrays, replacing the data block with a pointer indicating where the data block is residing in the one or more virtualized storage arrays; and
   if it is determined that the data block being written is not in the masterlist stored in the one or more virtualized storage arrays, writing the data block in one of the one or more virtualized storage arrays.

2. The method of claim 1, further comprising:
   updating the masterlist in the one or more virtualized storage arrays to include metadata associated with the written data block.

3. The method of claim 1, wherein the master list of metadata is includes an ordered weightage list decided based on number of occurrences of data blocks in each of the one or more virtualized storage arrays.

4. The method of claim 1, wherein the one or more virtualized storage arrays comprise thin provisioned virtual volumes.

5. A networked storage system, comprising:
   a host device;
   a DPM connected to the host device; and
   one or more virtualized storage arrays connected to the DPM,
   wherein the DPM is configured such that operations between the host device and the one or more virtualized storage arrays are communicated via the DPM,
   wherein each of the host device, the DPM and the one or more virtualized storage arrays includes an associated de-dup agent to enable application aware de-dup of data blocks on the one or more virtualized storage arrays,
   wherein the one or more virtualized storage arrays include a masterlist of metadata associated with indexed data stored therein,
   wherein the host device includes a sublist of metadata from the masterlist stored therein,
   wherein the de-duo agent associated with the host device is operable to:
      determine whether a data block being written has an entry in a sublist of the one or more sublists, the sublist stored in the host device; and
      if the data block has an entry in the sublist stored in the host device, replace the data block with a pointer indicating where the data block is residing in the one or more virtualized storage arrays, and wherein the de-duo agent associated with the one or more virtualized storage arrays is operable to:
- if it is determined that the data block being written has no entry in the sublist stored in the host device, determining whether the data block being written is in the masterlist stored in the one or more virtualized storage arrays;
- if it is determined that the data block being written is in the masterlist stored in the one or more virtualized storage arrays, replacing the data block with a pointer indicating where the data block is residing in the one or more virtualized storage arrays; and
- if it is determined that the data block being written is not in the masterlist stored in the one or more virtualized storage arrays, writing the data block in one of the one or more virtualized storage arrays.

6. The networked storage system of claim 5, wherein the de-dup agent associated with the one or more virtualized storage arrays creates the master list of metadata associated with indexed data and stores the masterlist in the one or more virtualized storage arrays.

7. The networked storage system of claim 6, wherein the de-dup agent associated with the host device and the DPM obtains the sublist of metadata from the masterlist and stores the sublist in the host device.

8. A networked storage system, comprising:
a host device; and
one or more virtualized storage arrays connected to the host device,
wherein each of the host device, and the one or more virtualized storage arrays includes an associated de-dup agent to enable application aware de-dup of data blocks on the one or more virtualized storage arrays,
wherein the de-dup agent associated with the one or more virtualized storage arrays creates a masterlist of metadata associated with indexed data and stores the masterlist in the one or more virtualized storage arrays,
wherein the master list of metadata includes an ordered weightage list decided based on number of occurrences of the data blocks in the one or more virtualized storage arrays,
wherein the de-dup agent associated with the host device:
  obtains sublists of metadata from the masterlist and stores the sublists in the host device;
  determines whether a data block being written has an entry in the sublist stored in the host device; and
  if the data block has an entry in the sublist stored in the host device, replaces the data block with a pointer indicating where the data block is residing in the virtualized storage arrays, and
wherein the de-dup agent associated with the one or more virtualized storage arrays:
  if it is determined that the data block being written has no entry in the sublist stored in the host device, determining whether the data block being written is in the masterlist stored in the one or more virtualized storage arrays;
  if it is determined that the data block being written is in the masterlist stored in the one or more virtualized storage arrays, replacing the data block with a pointer indicating where the data block is residing in the one or more virtualized storage arrays; and
  if it is determined that the data block being written is not in the masterlist stored in the one or more virtualized storage arrays, writing the data block in one of the one or more virtualized storage arrays.

9. A non-transitory computer-readable storage medium for application aware de-dup of data blocks on virtualized storage arrays in a networked storage system, having instructions that, when executed by a computing device causes the computing device to:
enable a de-dup agent on each of a host device, a DPM, and virtualized storage arrays, wherein the DPM is connected between the host device and to the virtualized storage arrays such that operations between the host device and the virtualized storage arrays are communicated via the DPM;
create a master list of metadata associated with indexed data and storing the masterlist in the virtualized storage arrays;
create one or more sublists of metadata from the masterlist and storing the one or more sublists in one of the host device and the DPM;
upon receiving a write request from an application residing in the host device, determines whether data block being written has an entry in a sublist stored in the host device; and
if so, replaces the data block with a pointer indicating where the data block is residing in the virtualized storage arrays;
if it is determined that the data block being written has no entry in the sublist stored in the host device, determining whether the data block being written is in the masterlist stored in the one or more virtualized storage arrays;
if it is determined that the data block being written is in the masterlist stored in the one or more virtualized storage arrays, replacing the data block with a pointer indicating where the data block is residing in the one or more virtualized storage arrays; and
if it is determined that the data block being written is not in the masterlist stored in the one or more virtualized storage arrays, writing the data block in one of the one or more virtualized storage arrays.

10. The non-transitory computer-readable storage medium 18, wherein the master list of metadata is includes an ordered weightage list decided based on number of occurrences of the data blocks in each of the virtualized storage arrays.

11. The non-transitory computer-readable storage medium 18, wherein the virtualized storage arrays comprise thin provisioned virtual volumes.

* * * * *